Dec. 31, 1940.         J. J. DILKS, JR         2,227,071
PICTURE FILM VIEWING APPARATUS
Filed April 21, 1938        7 Sheets-Sheet 1
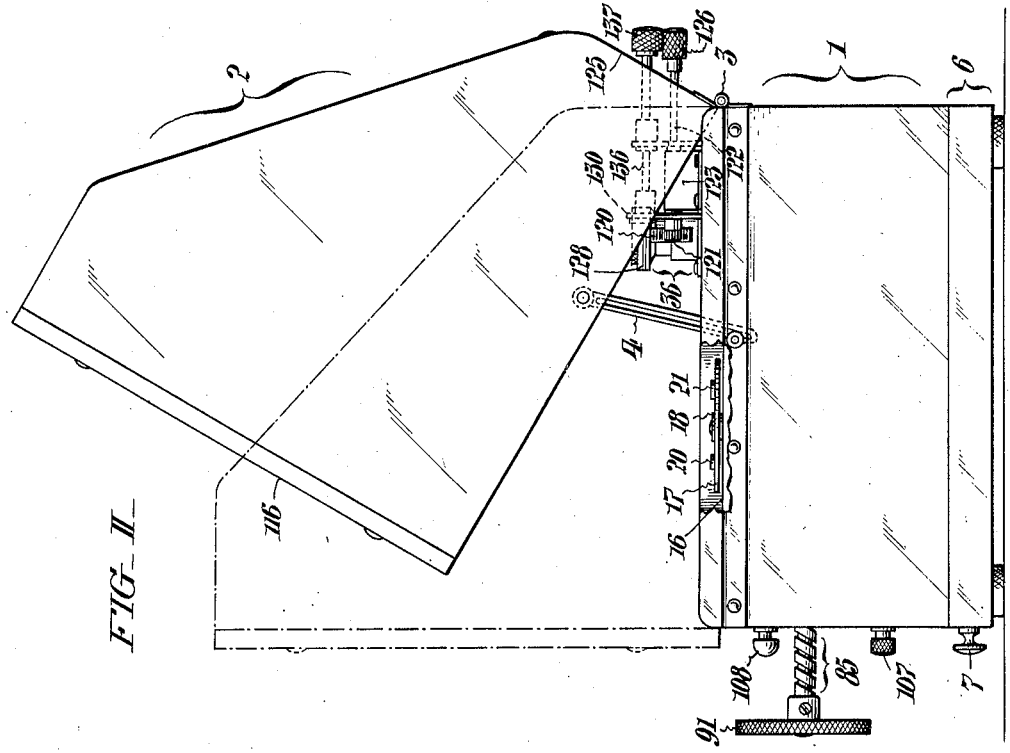
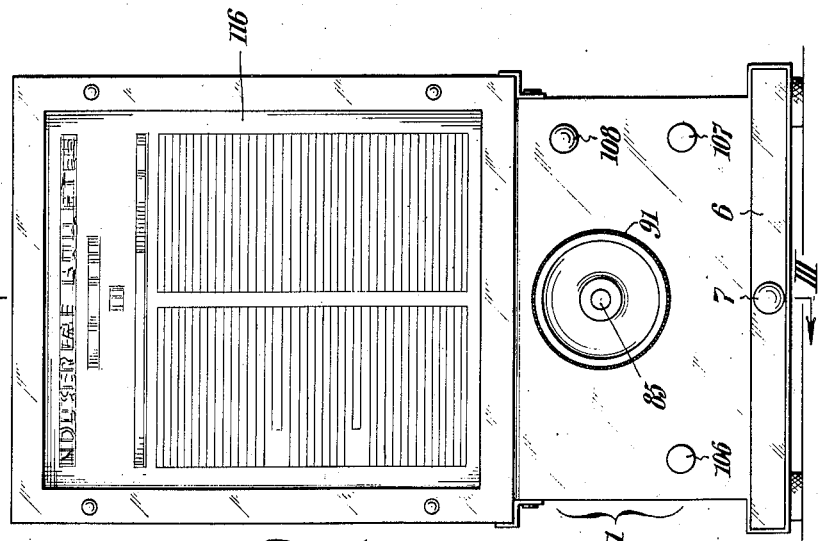
WITNESSES:
INVENTOR:
James J. Dilks, Jr.,
BY
ATTORNEYS.

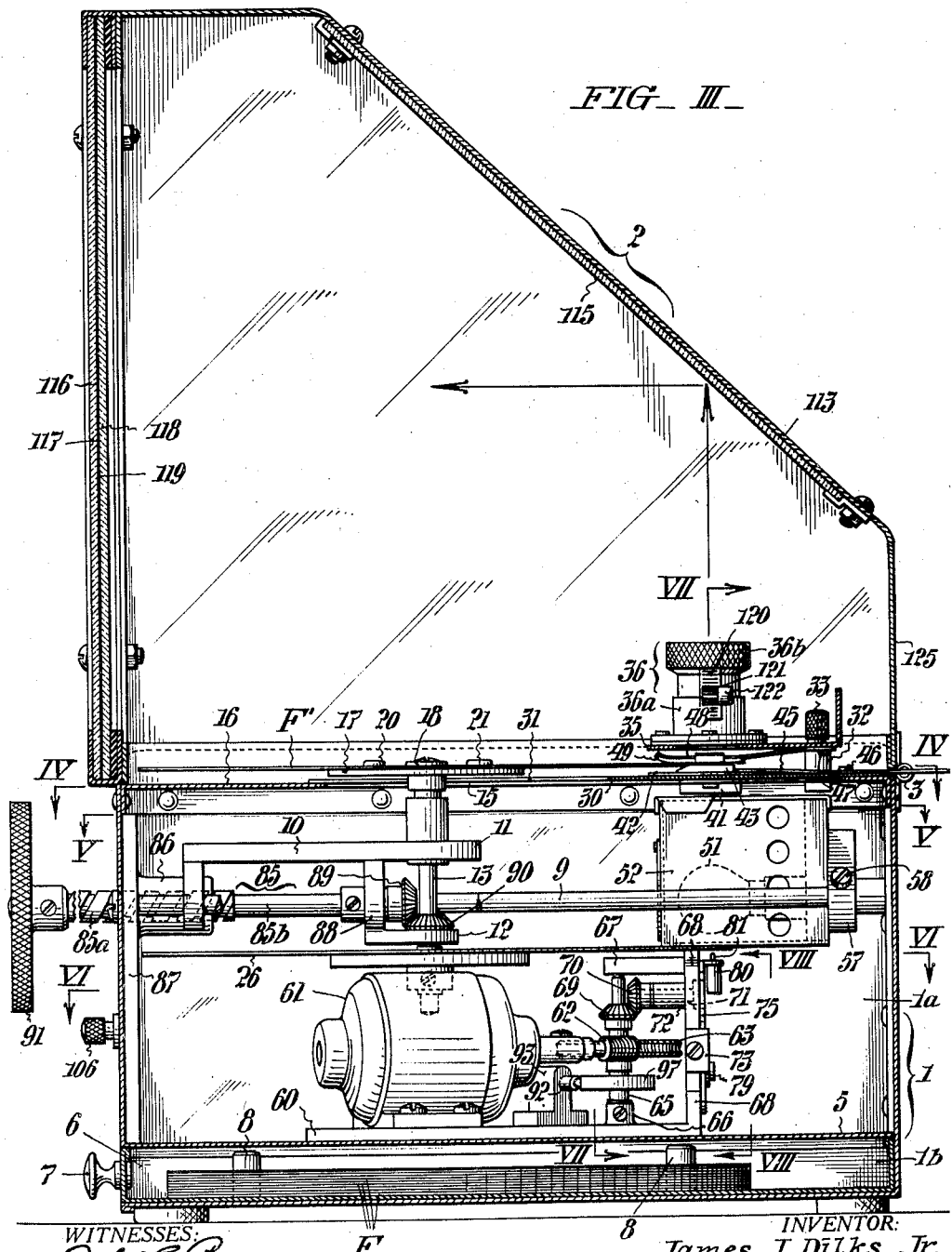

Dec. 31, 1940. J. J. DILKS, JR 2,227,071
PICTURE FILM VIEWING APPARATUS
Filed April 21, 1938 7 Sheets-Sheet 3
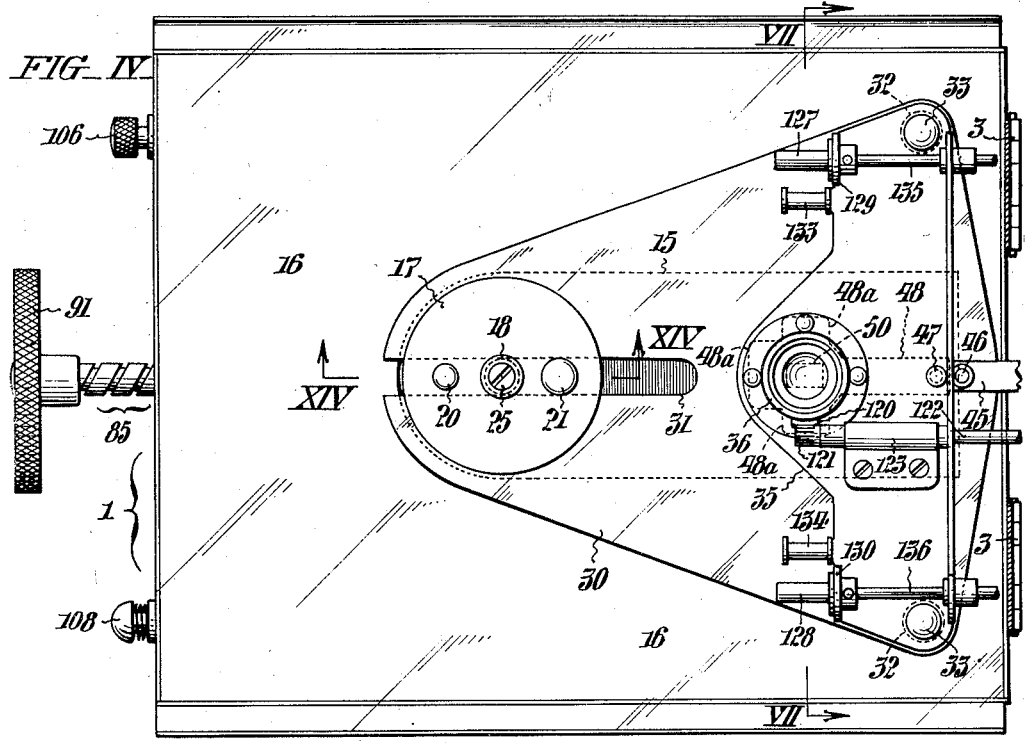
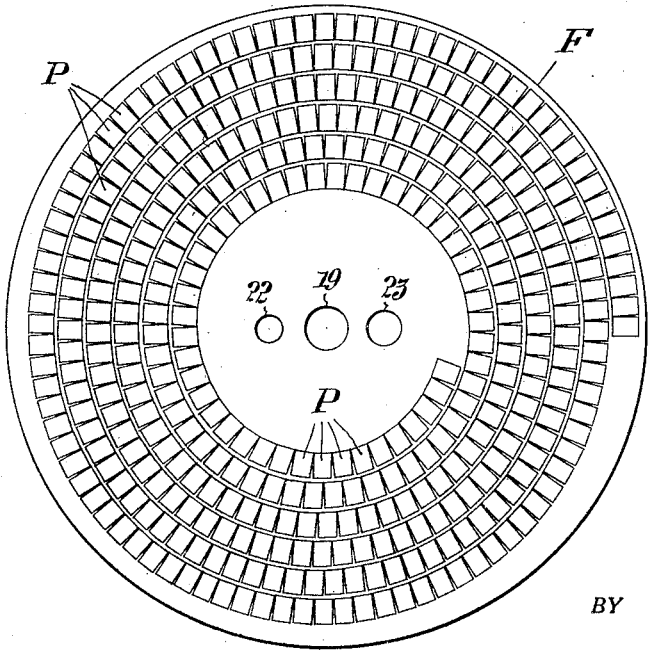
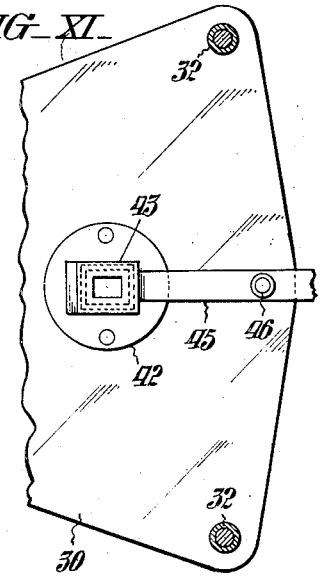
INVENTOR:
James J. Dilks, Jr.,
BY Paul Paul
ATTORNEYS.

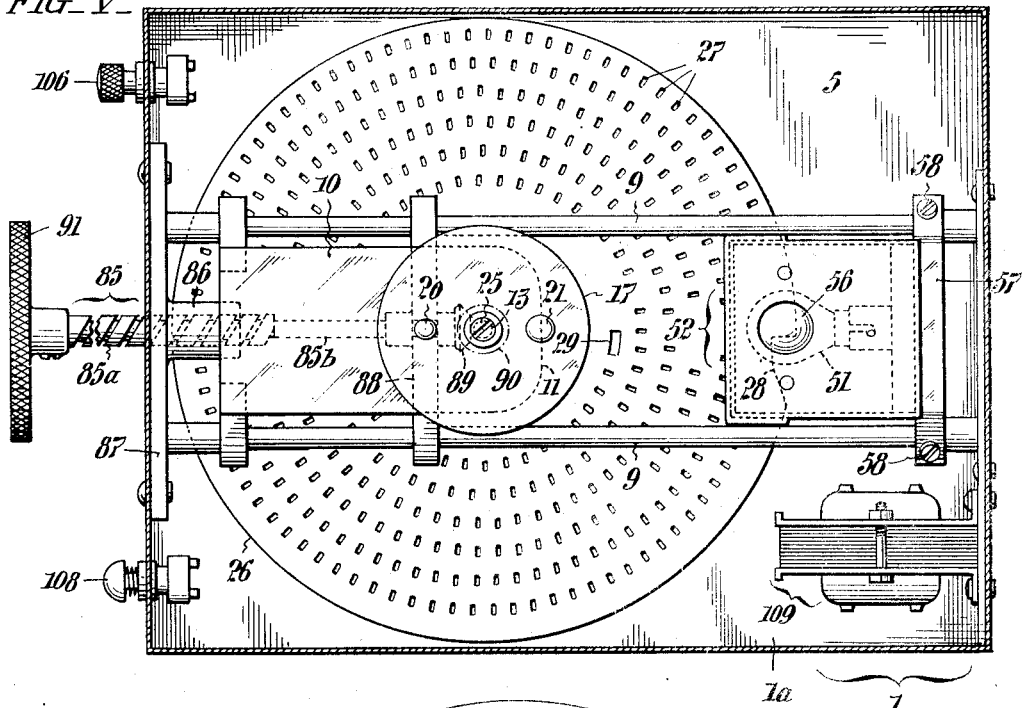
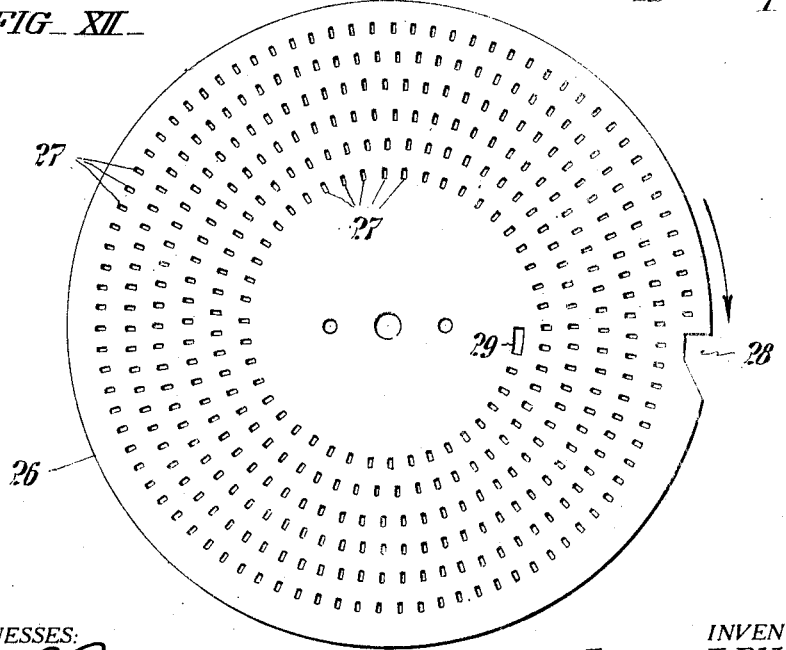

Dec. 31, 1940.  J. J. DILKS, JR  2,227,071
PICTURE FILM VIEWING APPARATUS
Filed April 21, 1938  7 Sheets-Sheet 5
FIG_VI_
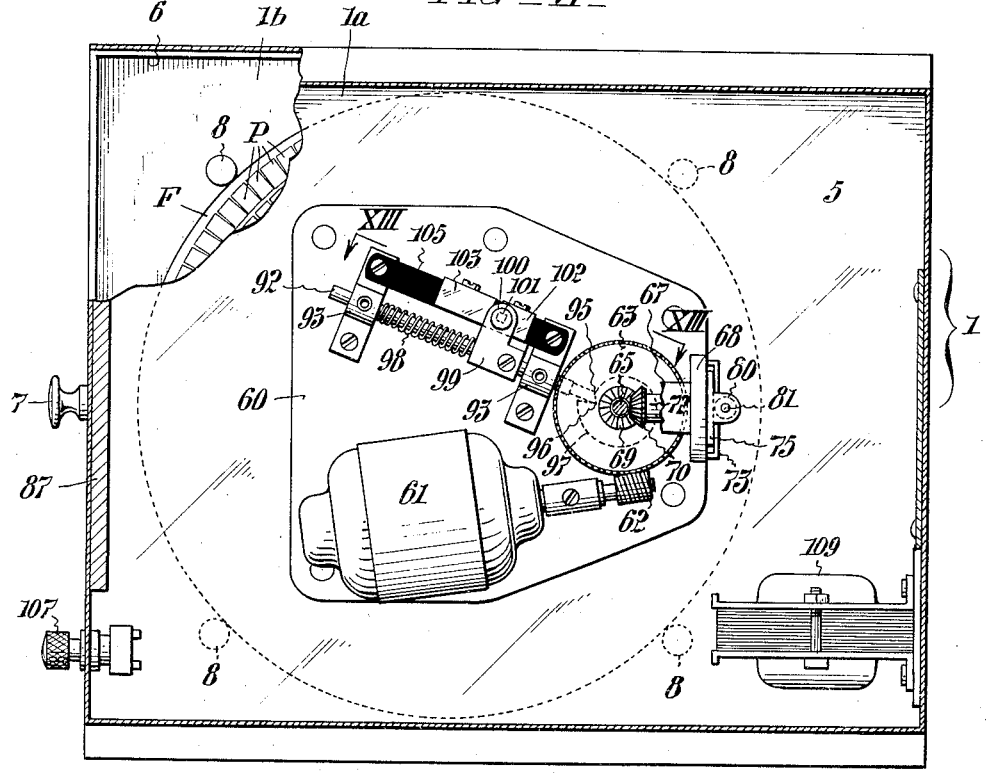
FIG_XIII_
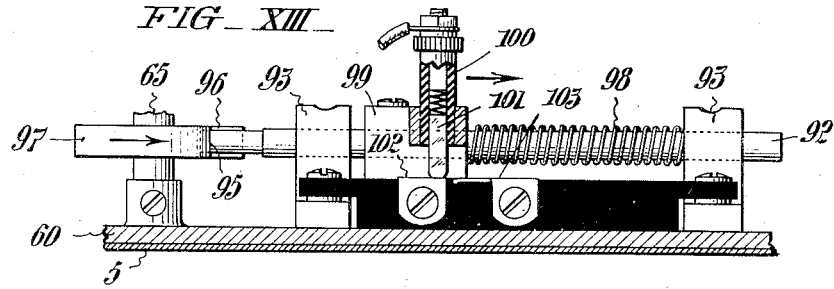
FIG_XIV_
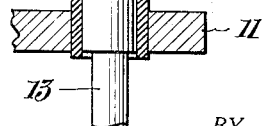
WITNESSES:
John C. Bergner
Hubert Fuchs
INVENTOR:
James J. Dilks, Jr.,
BY Paul & Paul
ATTORNEYS.

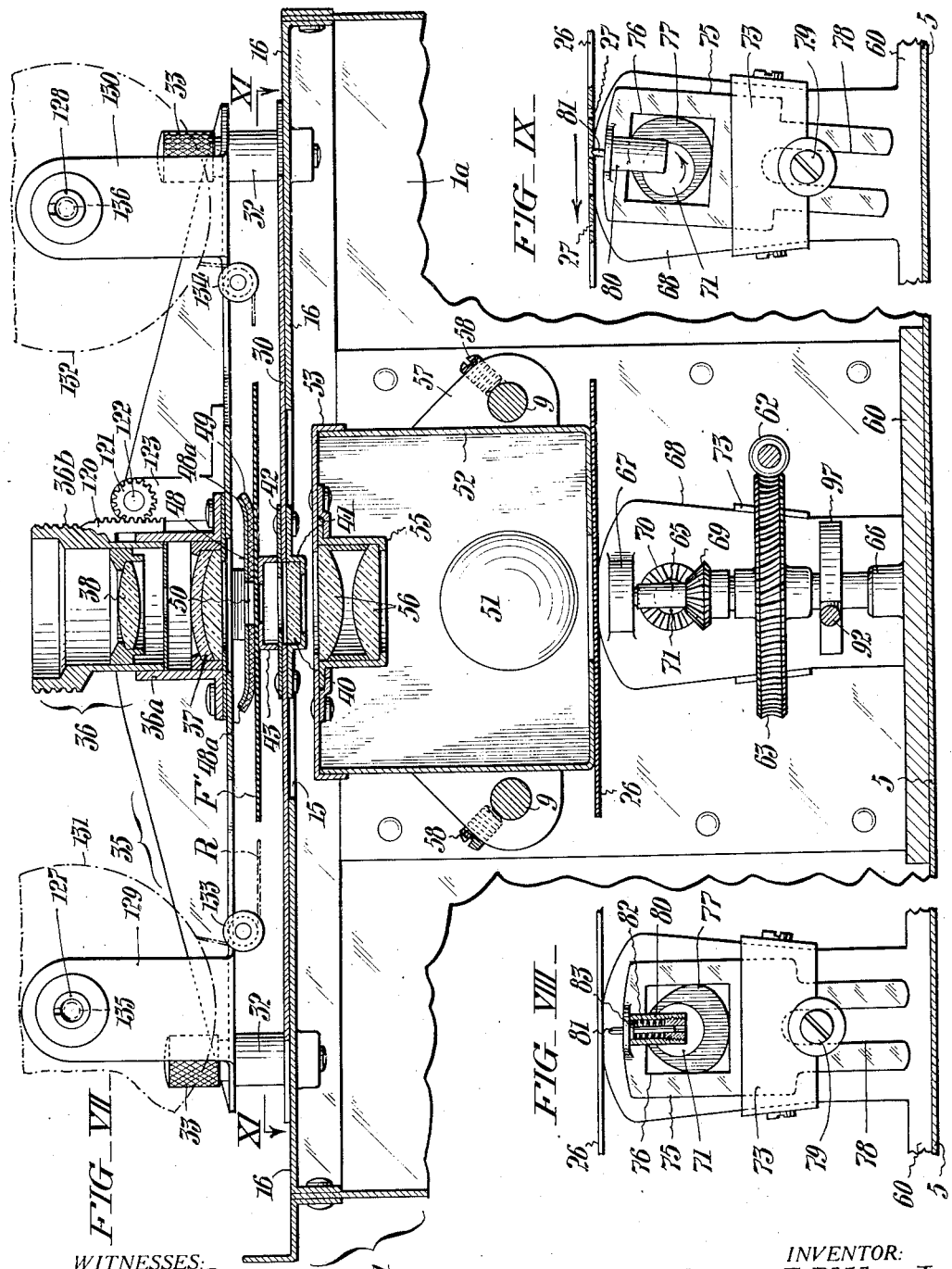

Dec. 31, 1940.   J. J. DILKS, JR   2,227,071
PICTURE FILM VIEWING APPARATUS
Filed April 21, 1938   7 Sheets-Sheet 7
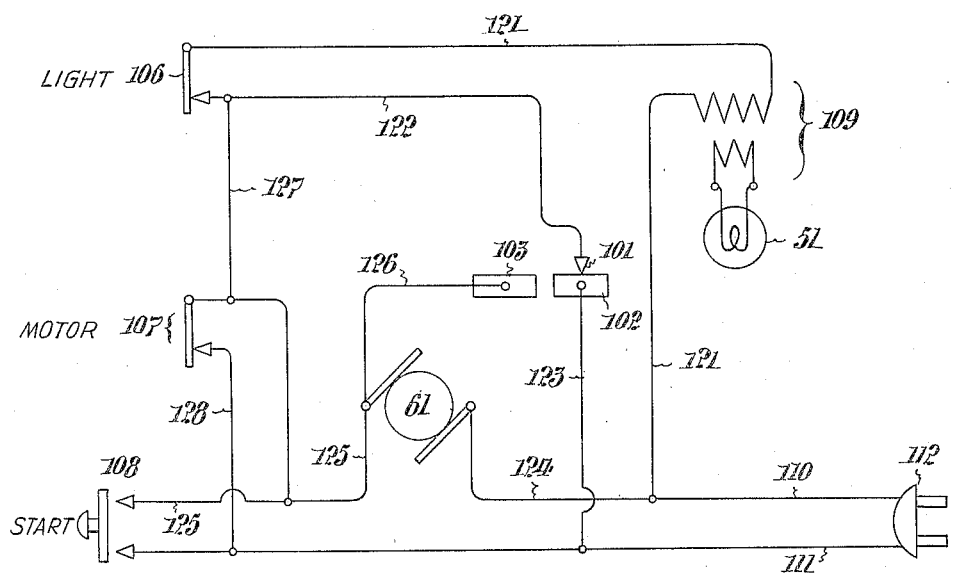
FIG. XV
WITNESSES:
INVENTOR:
James J. Dilks, Jr.,
BY
ATTORNEYS.

Patented Dec. 31, 1940

2,227,071

UNITED STATES PATENT OFFICE 2,227,071

PICTURE FILM VIEWING APPARATUS

James J. Dilks, Jr., Haddon Heights, N. J.

Application April 21, 1938, Serial No. 203,283

6 Claims. (Cl. 88—27)

This invention relates to picture film viewing apparatus, and has reference more particularly to apparatus for viewing film disks with annularly or spirally arranged pictures.

The chief aim of my invention is to provide a simple, compact and inexpensive, self contained apparatus of the kind specifically referred to having a casing with a viewing screen in one of its walls, and which encloses, in addition to a light source and projecting lens or lenses, driving mechanism for moving the film disk in such a manner that its annularly or spirally arranged pictures are successively presented to the lens or lenses for projection by the latter upon the screen.

In connection with film viewing apparatus having the foregoing attributes, I further aim to provide manual means operable from the exterior of the casing for starting the driving mechanism, as well as means for automatically stopping it after each rotative shift of the film disk and presentation of a new picture to the lens.

Another object of my invention is to provide means also operable from the exterior of the casing whereby the film disk may be quickly positioned for projection of any selected one of its pictures by the lens or lenses.

Another object of my invention is to provide automatic means for keeping the light shut off while the film disk is being moved so as to avoid eye strain.

Another object of my invention is to provide auxiliary means which will enable use of the apparatus for viewing ribbon films with longitudinally arranged pictures.

Other objects and attendant advantages will appear from the following detailed description of the attached drawings, wherein Fig. I shows, in front elevation, a picture film viewing apparatus conveniently embodying my invention.

Fig. II is a side elevation of the apparatus looking toward the right of Fig. I.

Fig. III is a vertical sectional view taken as indicated by the arrows III—III in Fig. I.

Fig. IV is a horizontal sectional view taken as indicated by the arrows IV—IV in Fig. III.

Fig. V is a horizontal section taken as indicated by the arrows V—V in Fig. III at a lower plane.

Fig. VI is a horizontal sectional view taken as indicated by the arrows VI—VI in Fig. III with a portion of the casing of the apparatus broken out in one corner to expose important features in a lower plane.

Fig. VII is a fragmentary vertical section taken as indicated by the arrows VII—VII in Figs. III and IV.

Fig. VIII is a fragmentary vertical section taken as indicated by the arrows VIII—VIII in Fig. III showing the means whereby the film disk is intermittently rotated.

Fig. IX is a view like Fig. VIII with the parts differently positioned.

Fig. X shows a film disk of the type for the viewing of which my apparatus is more particularly designed.

Fig. XI is a fragmentary detail plan sectional view taken as indicated by the arrows XI—XI in Fig. VII.

Fig. XII shows the top face view of the drive disk of the apparatus.

Fig. XIII is a fragmentary sectional view taken as indicated by the arrows XIII—XIII in Fig. VI.

Fig. XIV is a fragmentary detail sectional view on a larger scale taken as indicated by the arrows XIV—XIV in Fig. IV; and Fig. XV is a wiring diagram of various electrical elements embodied in the apparatus.

From Figs. I–III of these illustrations, it will be noted that the casing of the apparatus is fashioned from sheet material and as shown comprises a rectangular cabinet-like lower component 1 and a hood-like upper component 2 which is rectangular in plan like the lower component and hinged along its rear bottom edge to said lower component at 3. The upper component 2 can thus be swung upward from the normal position shown in dot and dash lines in Fig. II to the tilted position shown in full lines to enable placement and removal of the film disks which are to be viewed in the manner later on explained. A conventional form of latching brace is shown at 4 for holding the upper casing component in open position. A horizontal diaphragm 5 within the lower casing component 1 defines a relatively deep chamber or compartment 1a in which the drive mechanism of the apparatus is housed, and a shallower chamber or compartment 1b therebeneath which contains a drawer 6 for storage of a pile of picture film disks F which are to be viewed. As shown in Figs. III and VI, the drawer 6 has a pull knob 7 at the front, and upstanding from its bottom are suitably allocated studs 8 for confining the pile of disk films.

The disk films for the viewing of which the apparatus is designed more particularly are of the type shown in Fig. X with pictures or frames P annularly or spirally arranged. In addition to an axial aperture 19 the film disk F has a pair of symmetrically-disposed diametrically-arranged apertures 22, 23, which, for a reason later on explained, are of different diameters and in line with the first picture at the edge of the disk.

Extending from front to rear of the compartment 1a of the lower casing component 1 is a pair of fixed parallel guide rods 9 for a slide or carriage 10. At its inner end the carriage 10 provides spaced bearings 11, 12 for a vertical shaft 13 which extends up through a relatively wide longitudinal slot 15 in the top 16 of the lower casing component 1 and supports a small circular mounting or turn table 17 for the film disk F' which is being used for viewing. The turn table 17 has a hub 18 of which the upwardly projecting portion constitutes a centering stud fitting the axial hole 19 in the film disk F', and a pair of upstanding diametrically arranged buttons or studs 20, 21 which fit the holes 22, 23 in said disk. The film disk F' can thus be mounted in but one position on the turn table for assurance against error in placement. The hub 18 of the turn table has a conical bore 18a (Fig. XIV) to engage the tapered upper end 13a of the vertical shaft 13. A headed clamp screw 25 threaded axially into the top of the vertical shaft 13 serves to secure the turn table 17 with capacity for rotative adjustment. To the lower end of the shaft 13 is affixed a drive disk 26 of metal which, see Fig. XII, has small oblong holes 27 serially arranged in a spiral in correspondence with the pictures on the film disk F'. The driving disk 26 also has a notch 28 in its periphery corresponding in position to the first picture on the film disk, and a single relatively large circumferentially elongate hole 29 immediately beyond the innermost of the openings 27, the functions of which will be later on explained.

Overlying the slot 15 in the top 16 of the lower casing component 1 is a substantially triangular plate 30 which has a longitudinal slot 31 of a width to just clear the pendant portion of the hub 18 of the turn table 17. Removably supported at an elevation above the top 16 of the casing component 1 by a pair of studs 32 with holddown nuts 33, is a transverse bridge piece 35 which, in turn, supports at its center, a projecting lens holder 36 having a fixed section 36a containing a compound lens 37 (Fig. VII) and an adjustable section 36b which telescopically fits into the fixed section and which carries a single objective lens 38. Coaxial with the lenses 37, 38 is a plain blue-tinted "daylight" glass 40 which is supported by a cupped holder 41 affixed to the underside of the plate 30 and which is preferably of a quality resistive to ready passage of heat therethrough. To the top of the plate 30 is permanently secured a disk 42 with a central opening therein, and resting on this disk is a hollow upwardly-recessed element 43 whereof the top is at the level of the turn table 17 and provided with an oblong lens aperture which corresponds in size to the pictures of the film disk. The lens aperture element 43 is affixed to the inner end of a lever 45 which is fulcrumed at 46 on the plate 30 and extends to the exterior of the case as shown in Fig. III for convenience of manipulation in adjusting the element. Secured by a rivet 47 to the inner side of the bridge 35 (Figs. III, IV and VII) is a spring tongue 48 whereof the free end carries a pad 49 of felt or velvet which bears down upon the film disk F' diametrically over the element 43. As shown in Fig. VII, the tongue 48 has an oblong opening 50 in line with the projecting lens and wing extensions 48a laterally of said opening which curve upwardly to facilitate movement of the film disk therebeneath.

The light necessary for projection of the pictures is furnished by an electric bulb 51 enclosed in a light housing 52 within the component 1 of the casing. Suitably secured to the lid or cover 53 of the light housing 52 in line with the lenses 37, 38 and the bulb 51 is a holder 55 containing a pair of condensing lenses 56. When access to the bulb 51 is necessary, the cover 53 of the lamp housing 52 may be lifted up through the slot 15 in the top 16 of the lower casing component 1 upon removal of the triangular plate 30 with its appendages. As shown in Figs. III, V and VII, the light housing 52 is carried by a cross member 57 whereof the apertured ends slidably engage the rods 9 to accurately align the condensing lens 56 with the projecting lens after which it may be secured against accidental displacement by the set screws shown at 58 in Fig. VII.

The mechanism provided for moving the film disk F' so that its pictures are successively presented to the lens aperture for projection by the lenses 37, 38 is as follows:

Mounted on a base plate 60 within the lower component of the casing is an electric motor 61 having a worm 62 on its shaft in mesh with a worm wheel 63 on a vertical shaft 65 (which will hereinafter be referred to as the picker actuating shaft). At its lower end the shaft 65 is journaled in a bearing boss 66 on the base plate 60 and at the upper end in a bracket extension 67 reaching inwardly from a standard 68 on said base plate. Through a pair of miter gears 69, 70, rotary motion is transmitted from the vertical shaft 65 to a short horizontal shaft 71 journaled in a boss 72 on the standard 68. Held to the outer face of the standard 68 by a retaining strap 73 is a cam follower 75 (Figs. III, VIII and IX) which is fashioned from sheet metal with a square opening 76 in its upper portion adapted to be engaged by a rotary cam 77 at the outer end of the short shaft 71. In its lower portion the cam follower 75 has a longitudinal slot 78 which engages the shank of a headed screw stud 79 on said standard. On the outer face of the follower 75 adjacent the top thereof is a hollow cylinder 80 in which is guided the picker pin 81 whereof the upper projecting end is adapted to successively engage the apertures 27 in the drive disk 26. As shown in Fig. VIII, the picker pin 81 is yieldingly urged upward by a helical compression spring 82 within the cylinder 80, said spring bearing at its upper end against a collar 83 on said pin and said collar bearing in turn against the top of said cylinder. Under the influence of the rotary cam 77 the follower 75 is oscillated about the stud 79 and at the same time moved up and down once during each rotation of the shaft 71. As a consequence during each actuation of the picker actuating shaft 65 the picker pin 81 is first thrust upward into a hole 27 in the drive disk 26, then moved laterally to impart a rotative shift to the disk in the direction of the arrow indicated in Fig. XII, then drawn downward out of the hole, and finally moved laterally in the opposite direction in readiness to engage the next hole in the disk. The rotative shift thus imparted to the drive disk is communicated through the shaft 13 and the turn table 17 to the film disk F' so that a new picture is advanced to the aperture of the element 43 for projection by the lens. While the film disk F' is rotatively shifted in the manner just explained, it is also bodily shifted toward the objective lens to compensate for the diminishing radius of the spiral in which the pictures are serially arranged on the disk. This bodily shifting is accomplished by means of a horizontal screw spindle 85 having a threaded portion 85a of coarse pitch engaging a tapped boss 86 on a reinforcing plate 87 at the inner side of the front wall of the lower casing component 1, and a plain cylindric portion journaled in a bearing 88 on the carriage 10. At its inner end the spindle 85 carries a miter pinion 89 which is driven by an intermeshing miter pinion 90 on the shaft 13 of the turn table 17. As shown in Figs. II–V, the spindle 85 extends to the exterior of the casing where it is provided with a hand wheel 91 whereby it and the picker 81 intergeared with it may be manually operated to position the film disk for presentation of any selected one of its pictures at the lens aperture, or for starting the viewing at any desired point in the spiral.

For controlling the light bulb 51 and the motor 61, I have provided an automatic switch which includes a slide bar 92 (Figs. VI and XIII) which is radially aligned with the picker actuating shaft 65 and engaged in spaced guide bearings 93 on the motor base plate 60. One end of the slide bar 92 is beveled as at 95 to engage, when the apparatus is at rest, in a V-notch 96 in the periphery of a spiral edge cam 97 on the picker actuating shaft 65 with the picker pin 81 normally retracted from the drive disk 26 as shown in Fig. VIII. The slide bar 92 is yieldingly maintained in engagement with the cam 97 by a helical spring 98 in compression between a collar 99 on said bar and one of the bearings 93. As shown in Figs. VI and XIII, the collar 99 has a lateral arm at its outer end carrying a sleeve 100 of fiber or other dielectric material in which a spring pressed brush 101 is slidingly engaged. By reciprocation of the bar 92 under the influence of the cam 97 the brush 101 is caused to overtravel a pair of spaced contact plates 102, 103 secured to a block of insulation 105 bridging the guides 93. The electrical control means further include snap switches 106, 107 respectively for the light 51 and the motor 61, these being mounted on the front wall of the lower casing component 1 together with the motor-starting push button 108, see Figs. I–IV, and a transformer 109 which is located in one of the rear corners of the casing, see Fig. VI.

The wiring diagram of the apparatus is illustrated in Fig. XV wherein 110, 111 indicate the two conductors of a flexible cord or cable which is provided with a pronged plug 112 adapted for insertion into a wall socket of an A. C. circuit for supply of the electric current necessary to operate the light 51 and the motor 61.

As shown in Figs. II and III, part of the back wall of the upper component 2 of the casing is sloped as at 113 and to the inside of the sloping portion is secured a polished reflecting surface or mirror 115 by which the images projected upwardly through the lenses are reflected forwardly as indicated by the horizontal arrow in Fig. III to a vertical viewing screen 116 at the front of said upper component. The screen 116 consists preferably, of two panes 117, 118 of plain clear glass between which is interposed a sheet 119 of translucent paper or other thin sheet material.

For convenience of focusing the projecting lens, I have provided means including a toothed rack 120 at one side of the component 36b of the lens holder 36 and a spur pinion 121 to mesh with said rack. As shown in Fig. II, the spur pinion 121 is secured to the inner end of a stem 122 supported for rotation in the bearing 123 on the bridge plate 35, said stem extending readwardly to the exterior of the casing through a slot in the vertical portion 125 of the back wall of the cover component 2 to the exterior of the housing 5 and is provided at its outer end with a manipulating knob 126.

The operation of the apparatus is as follows:

Let it be assumed that the parts are all in starting position, i. e., with the carriage positioned as in Fig. V; with the peripheral notch of the driving disk 26 directly over the picker pin 81; with the picker pin in the normally retracted position shown in Fig. VIII; with the film disk mounted on the turn table so that the first picture thereof (that nearest the edge) in the line of the projecting lenses; and with the brush engaging the contact plate as in Fig. XV. With this preparation, the switches 106, 107 are closed as shown in Fig. XV. Through closing of the switch 106 a circuit is established through the primary coil of the transformer 109 by way of branch conductors 121 leading from the conductor 110, a branch 122 connected to the brush 101, contact plate 102 and a branch conductor 123 leading to the supply main 111. As a result of the lighting, the first picture is projected by the lens onto the mirror and by the latter reflected onto the viewing screen. When the observer is ready to view the next picture, he momentarily presses the starting button 108 as a result of which a circuit is established through the motor 61 by way of a branch conductor 124 leading from the motor to the switch 108, and the main 111. Immediately upon starting of the motor 61 the slide 92 is shifted leftward in Fig. VI by the rotary cam 97 on the picker actuating shaft 65, with the result that the brush 101 is moved off the plate 102, with interruption of current flow through the bulb 51, and advanced to the plate 103 so that current flow through said motor is maintained by way of conductor 124 which connects with the main 110, branch conductors 126, plate 103, conductor 122, branch conductor 127, switch 107 and branch conductor 128 which connects with the main 111. As a consequence of the rotation of the shaft 71 through the gearing 62, 63 and 69, 70, the picker 81 engages the first hole 27 whereby the drive disk 26 is turned and at the same time radially shifted by the screw 85 with attendant presentation of a new picture of the film F' to the projecting lens. Upon completion of a single rotation of the picker actuating shaft 65, the beveled end of the slide 92 suddenly drops off the high point of the cam 97 into the notch 96 of the latter. As a result, the brush 101 is shifted, under the influence of spring 98 from the contact plate 103 back to the contact plate 102, with attendant interruption of current supply to the motor 61 and re-establishment of the circuit through the bulb 51. The above procedure is repeated until all the pictures of the film disk F' have been viewed, and when the elongate terminal idling hole 29 of the driving disk 26 finally reaches the picker 81 so that the disk will not be further moved notwithstanding starting of the motor 61 by means of the push button 108. By manual manipulation of the screw spindle 85 as previously mentioned herein, it is possible to quickly position the film disk F' for projection of any desired picture in the spiral series or for commencing the viewing at any desired point in the spiral.

My improved apparatus is advantageous for the viewing of film disks in which, for example, the serially arranged frames are pictures of successive pages of a book, or successive pictures of a medical subject or a machine which is to be closely and intimately studied.

In order that the apparatus may be used for viewing the pictures of ribbon films, I have further provided auxiliary means including a pair of spindles 127, 128 respectively journaled for rotation in upstanding projections 129, 130 at opposite ends of the bridge piece 35, upon which spindles the spools or reels 131, 132 for the ribbon film R are adapted to be mounted as shown in dot and dash lines in Fig. VII. By means of guide rolls indicated at 133, 134 the ribbon film R is confined to travel in a straight line between the aperture members 43 and 48. From Figs. II and IV, it will be observed that the spindles 127, 128 have rearward shaft prolongations 135, 136 which pass outward through suitable clearance slots in the vertical portion 125 of the rear wall of the cover component 2 of the housing, and are fitted at their outer ends with manipulating knobs such as the one shown at 137 in Fig. II. It will be seen that by this means, the ribbon film R can be shifted in one direction or the other as desired to present individual pictures thereon into registry with the opening 50 in the aperture member 48 for projection by the lens of the apparatus onto the viewing screen 116.

Having thus described my invention, I claim:

1. A picture film viewing apparatus comprising a casing with a viewing screen in one of its walls; a light source and an aligned projecting lens within the casing; a lens aperture element interposed between the light source and the lens; a carriage confined to movement laterally of the lens; a rotary shaft journalled in the carriage; a mounting on said shaft for a film disk with annularly-arranged pictures; a drive disk also secured on said shaft and having openings therein corresponding in position with the pictures on the film disk; a picker for successively engaging the openings in the drive disk to intermittently rotate the mounting and film disk thereon; an electric motor; interposed mechanism whereby the picker is actuated from the motor; a manual starting switch for the motor exteriorly of the casing; and automatic switch means actuated by the mechanism aforesaid and determining an operative cycle for the motor such that the film disk is rotated each time only by a distance corresponding to the spacing of its pictures, and then stopped until the motor is again started by means of the manual switch for repetition of the cycle.

2. A picture film viewing apparatus comprising a casing with a viewing screen in one of its walls; a light source and an aligned projecting lens within the casing; a lens aperture element interposed between the light source and the lens; a rotary shaft; a mounting on said shaft for a film disk with annularly-arranged pictures; a drive disk also secured to said shaft and having openings therein corresponding in position with the pictures on the film disk; a picker for successively engaging the openings in the drive disk to intermittently rotate the mounting and the film disk thereon to determine presentation of said pictures likewise in succession at the lens aperture for projection by lens upon the screen; driving means including a picker actuating shaft operative during each rotation to actuate the picker once, and an electric motor intergeared with said picker actuating shaft; and means for controlling the motor including a manual starting switch at the exterior of the casing, and an automatic switch operated from the picker actuating shaft whereby the current flow to the motor is interrupted upon completion of a single rotation of said picker-actuating shaft.

3. A picture film viewing apparatus comprising a casing with a viewing screen in one of its walls; a light source in the form of an electric light bulb and an aligned projecting lens within the casing; an aperture element interposed between the bulb and the lens; a rotary mounting for a film disk with annularly-arranged pictures; a drive disk coaxial with the mounting and having openings therein corresponding in position with the pictures on the film disk; a picker for successively engaging the openings in the drive disk to intermittently rotate the mounting and the film disk so as to determine presentation of the pictures likewise in succession at the lens aperture for projection by the lens upon the screen; driving means including a picker-actuating shaft operative during each rotation to actuate the picker once, and an electric motor intergeared with said shaft; means for controlling the motor including a manual starting switch at the exterior of the casing, and an automatic switch operated from the shaft to interrupt current flow to the motor upon completion of a single rotation of the shaft; and a circuit controlled by the automatic switch whereby the current flow to the electric bulb is interrupted during the operative phases of the motor.

4. A picture film viewing apparatus according to claim 1, including quick setting means operable from the exterior of the casing whereby the disk may be selectively positioned for presentation of any desired picture on the film to the projecting lens.

5. A picture film viewing apparatus comprising a casing with a viewing screen in one of its walls; a light source and an aligned projecting lens within the casing; a lens aperture element interposed between the light source and the lens; a carriage confined to movement laterally of the lens; a rotary shaft journalled in the carriage; a mounting on said shaft for a film disk with spirally arranged pictures; a drive disk also secured on said shaft and having openings therein corresponding in position with the pictures on the film disk; a picker for successively engaging the openings in the drive disk to intermittently rotate the mounting and the film disk thereon; a screw-spindle geared to the shaft for shifting the carriage concurrently with the rotative shifting of the film mounting; an electric motor; interposed mechanism whereby the picker is actuated from the motor; a manual starting switch for the motor exteriorly of the casing; and automatic switch means actuated by the mechanism aforesaid to determine an operative cycle for the motor such that the film disk is rotated each time only by a distance corresponding to the spacing of its pictures and then stopped until the motor is again started by means of the manual switch for repetitions of a cycle.

6. A picture film viewing apparatus according to claim 5, in which the screw spindle extends to the exterior of the casing so that it may be manipulated to effect quick rotation of the mounting and shifting of the carriage for presentation of any desired picture to the projecting lens.

JAMES J. DILKS, Jr.